United States Patent [19]

Sutherland et al.

[11] Patent Number: 5,442,004
[45] Date of Patent: Aug. 15, 1995

[54] GELS

[75] Inventors: Alistair A. P. Sutherland; John M. Hudson, both of Swindon, England

[73] Assignee: Raychem Limited, London, England

[21] Appl. No.: 150,669

[22] Filed: Nov. 10, 1993

Related U.S. Application Data

[63] Continuation of Ser. No. 844,633, Mar. 30, 1992, abandoned.

[30] Foreign Application Priority Data

Oct. 5, 1989 [GB] United Kingdom ............... 8922445

[51] Int. Cl.$^6$ ............................................. C08K 5/52
[52] U.S. Cl. ................................. 524/140; 524/127; 524/141; 524/575
[58] Field of Search ................ 524/127, 140, 141, 575

[56] References Cited

U.S. PATENT DOCUMENTS

| | | | |
|---|---|---|---|
| 3,827,999 | 8/1974 | Crossland | 260/33.6 |
| 4,351,913 | 9/1982 | Patel | 523/54 |
| 4,361,507 | 11/1982 | Bourland | 523/173 |
| 4,369,284 | 1/1983 | Chen | 524/476 |
| 4,617,422 | 10/1986 | Hagger | 174/23 C |
| 4,618,213 | 10/1986 | Chen | 350/96.34 |
| 4,709,982 | 12/1987 | Comer et al. | 350/96.23 |
| 4,798,853 | 1/1989 | Handlin, Jr. | 523/173 |

FOREIGN PATENT DOCUMENTS

| | | | |
|---|---|---|---|
| 0224389 | 6/1987 | European Pat. Off. | C08L 53/00 |
| 0299718 | 1/1989 | European Pat. Off. | C08L 53/00 |
| WO84/04314 | 11/1984 | WIPO | C08L 53/00 |
| WO88/00603 | 1/1988 | WIPO | C08L 53/02 |
| WO90/05166 | 5/1990 | WIPO | C08L 53/00 |

OTHER PUBLICATIONS

*Ullmann's Encyclopedia of Industrial Chemistry*, 5th Rev. Ed., W. Gerhartz, Exec. Ed., vol. A3, p. 96 (VCH Verlagsgesellschaft mbH, Germany, 1985).

*Handbook of Chemical Synonyms and Trade Names*, Gardner et al., eds., p. 382 (CRC Press 1978).

Primary Examiner—Paul R. Michl
Assistant Examiner—Edward J. Cain
Attorney, Agent, or Firm—Herbert G. Burkard; Yuan Chao; A. Stephen Zavell

[57] ABSTRACT

Gels of hard-elastomer-hard block copolymers with at least 300 parts of extending liquid per 100 parts of the copolymer contain at least 50 parts (per 100 parts of copolymer) of a stabilizing additive which resists migration of PVC plasticizers into the gel when in contact with a plasticized PVC article. Styrene-(ethylene-butylene)-styrene triblock copolymers with organic phosphate stabilizers are preferred, these stabilizers tending to raise the gel softening temperature.

19 Claims, No Drawings

GELS

This application is a continuation of application Ser. No. 07/844,633, filed Mar. 30, 1992 now abandoned, the disclosure of which is incorporated herein by reference.

This invention relates to a gel composition, by which is meant a liquid-extended polymer composition having a cone penetration value (measured by a modified version of ASTM D217, as described below) within the range from 50 to 400 ($10^{-1}$ millimetres); and preferably an ultimate elongation (measured by ASTM D412 as described below) greater than 100%, with substantially elastic deformation to an elongation of at least 100%; ultimate tensile strength (ASTM D412) less than 1 MegaPascal; and dynamic storage modulus (as hereinafter described) less than 50000 Pascals. The composition may either contain a three-dimensional network of cross-linked molecular chains (gels) or may merely behalf as it if contained such a network (gelloids).

Oil-extended compositions of block copolymers are know, for example from U.S. Pat. Nos. 3,676,387 (Lindlof), 3,827,999 (Crossland), 4,176,240 (Sabia), and 4,369,284 (Chen), and published International Patent Application WO8800603, and it has previously been found necessary to subject copolymer-oil adhesive compositions to radiation cross-linking in order to modify their physical and adhesive properties, as described for example in European Published Patent Application 0224389 (Raychem, Gamarra), U.S. Pat. Nos. 3,845,787 (Haefele) and 4,151,057 (St Clair) and in "Radiation Curing of PSA's Based on Thermpolastic Rubbers" by D. J. St. Clair, in *Adhesives Age*, March 1980, pages 30–36.

The present invention improves the characteristics of gel or gelloid compositions (hereinafter referred to simply as "gels") without the problem of crosslinking.

A further problem arises when gels are placed in surface contact with plasticised PVC articles, such as electrical cable jackets for example, since the PVC plasticiser tends to migrate into the gel, thus embrittling the PVC article. and possibly also degrading the gel. The present invention is capable of alleviating this problem, and in some cases may furthermore improve the properties of the gel.

The invention accordingly provides a gel or gelloid liquid-extended polymer composition having (i) an ASTM D217 cone penetration value within the range from 50 to 400 ($10^{-1}$ millimetres), (ii) an ASTM D412 ultimate elongation greater than 100% with substantially elastic deformation to an elongation of at least 100%, (iii) and ASTM D412 ultimate tensile strength of less than 1 MegaPascal, and (iv) a dynamic storage modulus at 23° C. of less than 100000 Pascals; the composition comprising an ultimate mixture of (a) at least one block copolymer containing relatively hard blocks and relatively elastomeric blocks;
(b) at least 300 parts by weight of extending liquid are 100 parts by weight of the said copolymer(s), which liquid extends and softens the said elastomeric blocks; and
(c) at least 50 parts by weight per 100 parts by weight of the copolymer(s) (a), of a plasticiser-stabilising additive (which preferably does not significantly depress the softening temperature of the composition), comprising
   (i) a stabilising material capable of either establishing substantial equilibrium with, or resisting migration into the composition of, one or more PVC plasticisers of a plasticised PVC article with which the composition in use is to be placed in surface contact, and either the stabilising material (i) raises or does not significantly depress the softening temperature of the composition, in which case the additive (c) may optionally include
   (ii) a temperature-raising material which raises the softening temperature of the composition,
or the stabilising material (i) significantly depresses the softening temperature of the composition, in which case the additive (c) includes a sufficient quantity of the temperature-raising material (ii) to compensate for at least 50% (preferably at least 75%, more preferably at least 90%, and especially substantially 100% or more) of the depression caused by the stabilising material.

A "significant" depression of the softening point (hereinafter Ts) may be regarded as more than about 5° C. for example, although this working guideline may vary in accordance with circumstances, such as the range of temperatures over which the gel is intended to operate.

In its preferred embodiments, the invention is particularly concerned with gel or gelloid compositions in which the gel-forming polymer mainly (more than 50%, preferably more than 90%, especially 95–100%, of the total polymer) comprises the block copolymer materials having relatively hard blocks and relatively elastomeric blocks (e.g. hydrogenated rubber blocks). Especially interesting block copolymers for the purposes of this invention are those wherein the hard blocks comprise polystyrene. The weight ratio of the hard blocks to the elastomeric blocks in those (and other) copolymers is preferably within the range from 0.25:1 to 0.75:1. The elastomeric blocks preferably comprise a polyalkylene material, preferably within the range from 0.25:1 to 0.75:1. The elastomeric blocks preferably comprise a polyalkylene material, preferably a hydrogenated rubber. Examples of such styrene-alkylene block copolymers include styrene-alkylene-styrene triblock copolymers such as styrene-diene tri-block copolymers (linear or radial), for example styrene-butadiene-styrene or styrene-isoprene-styrene or styrene-(ethylene-butylene)-styrene triblock copolymers.

Among such block copolymers useful in the present invention are the hydrogenated styrene-diene block copolymers in which the styrene blocks have a molecular weight within the range from 2000 to 50000 and the diene blocks have a molecular weight within the range from 20000 to 300000. Preferred are those having at least two styrene end-blocks and at least one diene mid-block, the styrene end blocks comprising up to 55% by weight of the block copolymer. Examples include poly(styrene-ethylene-butylene-styrene) triblock copolymers generally referred to as SEBS triblock copolymers. These copolymers have styrene end blocks and ethylene and butylene centre blocks and are characterised by the ratio of styrene blocks to the combined ethylene-butylene blocks. Blends of two different SEBS triblock copolymers e.g. as described in European Published Patent Application 0224389 (Gamarra), the disclosure of which is incorporated herein by reference, can be used to provide oil-extended elastomeric gels according to this invention having certain desired cone penetration, elongation and tensile strength properties.

Other styrene-diene block copolymers useful in compositions of this invention include poly(styrene-butadiene-styrene) block copolymers (SBS), poly(styrene-isoprene-styrene) block copolymers (SIS) and similar known styrene-diene block copolymers. The SEBS block copolymers are preferred. The copolymer material (a) may comprise mixtures of two or more block copolymers.

Additional polymers which may be mixed with styrene block copolymers are polyphenylene ethers (PPO), for example poly(2,6-dimethyl-1,4-phenylene)ether, which have substantially complete compatibility with the polystyrene blocks and may improve the temperature resistance of the gels. The advantages of such mixtures are described in the aforementioned WO8800603, the disclosure of which is incorporated herein by reference.

Preferably at least one (preferably all) material of the additive (c), and preferably also of the extender liquid (b), is (are) substantially incompatible with the copolymer hard blocks.

Preferably, at least one of the materials (i) and (ii) of the non-polymeric additive has a solubility parameter (calculated from Small's group molar attraction constants) of at least 9, preferably within the range from 9.0 to 10.6, more preferably 9.58 to 10.55, and especially 10.00 to 10.52, $[cal/cm^3]^{0.5}$. This preference is explained with reference to the following list of 24 additive materials ranked in order of their solubility parameters (S.P.) and showing the resulting gel softening temperature (Ts) in gels formed by methods hereinafter described from 7.5% by weight Kraton B1651 SEBS copolymer, 20.0% by weight additive material, 1.0% by weight Irganox 1010 (TM, CIBA) antioxidant, and 71.5% by weight Fina Vestan A360B (TM, Fina Chemicals) paraffin/naphthene oil extender. Ts of the gel with the additive material replaced by more of the oil is 120° C.

| MATERIAL | S. P. | Ts(°C.) |
| --- | --- | --- |
| 1. Butyl carbitol adipate. | 7.10 | 68 |
| 2. Epoxidised soybean oil (TM "Estabex 2381") | 8.00 | 52 |
| 3. Epoxidised oil (TM "Kodaflex TXIB") | 8.20 | 61 |
| 4. Trioctyl phosphate | 8.35 | 58 |
| 5. Epoxidised oil (TM "Flexol 4GO") | 8.50 | 28 |
| 6. Ester plasticiser (TM "Bisoflex DUP") | 8.80 | 48 |
| 7. Ester plasticiser (TM "Bisoflex TOT") | 8.90 | 72 |
| 8. Triethyl phosphate | 9.07 | 120 |
| 9. Dibenzofuran | 9.35 | 67 |
| 10. Diethylene glycol monobutyl ether | 9.50 | 72 |
| 11. Tris(1-chloroprop-2-yl)phosphate | 9.59 | 118 |
| 12. Triphenyl phosphate(s) | 10.00 | 135 |
| 13. 2,2-oxybis(ethanol)dibenzoate | 10.10 | 137 |
| 14. Tris(1-chloroethyl)phosphate | 10.26 | 140 |
| 15. 2,2-bis(chloromethyl)-1,3-propylene-bis (2-chloroethyl)phosphate | 10.47 | 137 |
| 16. Tris(1,3-dichloropropyl)phosphate | 10.52 | 129 |
| 17. Polyethylene glycol 200 | 10.70 | 120 |
| 18. Glycerol monoacetate | 11.50 | 116 |
| 19. Diphenyl sulphone | 12.50 | 169 |
| 20 E-caprolactam | 12.70 | 141 |
| 21. Propylene carbonate | 13.30 | 145 |
| 22. Tetramethylene sulphone | 13.40 | 148 |
| 23. Dimethyl sulphone | 14.50 | 125 |
| 24. Ethylene carbonate | 14.70 | 135 |

The commercially available materials used for some of these additives, which are thought to have the chemical content indicated above, are as follows:
1. Bisoflex 111 (TM) from British Petroleum.
2. Estabex 2381 (TM) from Akzo Chemie.
6. Bisoflex DUP (TM) from British Petroleum.
7. Bisoflex TOT (TM) from British Petroleum.
11. Tolgard TMCP (TM) from Tenneco Organics Ltd.
13. Benzoflex 245 (TM) from Velsicol Chemical Corporation.
14. Genemol P (TM) from Hoechst.
15. Tolgard V6 (TM) from Tenneco Organics Ltd.
16. Tolgard TDCP (TM) from Tenneco Organics Ltd.

It is observed that materials 1 to 10, with the exception of material 8, severely depressed Ts. Many of these materials are known as PVC plasticisers, and so may have a useful equilibrium-forming stabilising effect when used as material (i) of additives according to this invention, together with a temperature-raising material (ii). Materials 8 and 11 to 16 were all found, in separate tests, to have a stabilising effect due to their resistance to migration of PVC plasticisers into the gel (hereinafter "plasticiser resistance") and could accordingly be used alone as the stabilising material (i) of the additive. Materials 8 and 11 had only an insignificant effect on Ts, whereas materials 12 to 16 significantly raised Ts and could thus also be used as material (ii) of the additive together with stabilising materials (i) for example equilibrium-forming plasticisers such as materials 1 to 7, 9 and 10. Such material (ii) could compensate for the depression of Ts caused by the stabilisers (i) or could raise Ts in cases where it is unaffected by the stabilisers. For example material 14 could be used to counteract the depressive effect of material 4.

Materials 17 and 18 do not significantly depress Ts, but were found on testing to lack stabilising effect, and are thus of no interest for the present invention. Materials 19 to 24 all raise Ts (No. 23 barely significantly), but also lack stabilising effect. Materials 19 to 24 could therefore b used as the temperature-raising material (ii) of the additive together with suitable stabilising materials (i) to compensate for depression of Ts, or to raise Ts, as aforesaid. However, it is found in practice that materials 19 to 24, all of which are solids at room temperature, tend to separate out of the gel composition, with resultant effects on the appearance, and perhaps the performance, of the gels, which may be unacceptable for some end uses. It is accordingly preferred that at least one (preferably both) of the materials (i) and (ii) (when present) of the additive is (are) liquid (b). However, solid materials such as materials 19 to 24 may still be useful for some purposes, especially if they have good solubility in the extender liquid.

It can thus be seen that aforementioned ranges of solubility parameter provide a useful guide to selection of additive materials, within which guideline suitability of materials is readily determined by simple trial-and-error testing of their effect on Ts and their stabilising effect compared with a control containing no such additive. Plasticiser-stabilising effect can be tested, for example, by encapsulating weighed plasticised PVC samples in a gel containing the additive to be tested, for example in the aforementioned proportions, and maintaining the encapsulated samples at 70° C. for suitable periods, e.g. a week or a fortnight or two. After removal from the gel, which usually peels cleanly from the sample surface, the samples are re-weighed, and any loss of weight may be compared with that of the control to see if the additive reduces the degree of loss of the PVC plasticiser into the gel.

The additive materials having solubility parameter (S.P.) greater than 9 will not only preferably be liquids as aforesaid but will also preferably exclude oxygenheterocyclic aromatics (material 9); alkanols; and glycols and polyols and their mono-ethers and mono-ethers (e.g. materials 10, 17, 18). Materials of S.P. below 9 tends to depress Ts (e.g. materials 1 to 7, 9, 10), while materials of S.P. above 10.6 may tend to have problems as indicated above for materials 17 to 24. Within the preferred range of S.P. from 9 to 10.6, S.P. of 9.58 to 10.55 excludes the short chain alkyl phosphate material 8, while the range of S.P. from 10.00 to 10.52 includes the most beneficial materials 12 to 16, most of which are organic phosphates, as is preferred. Halogenated (preferably chlorinated) or unhalogenated phosphates e.g. alkyl phosphates having up to 6, preferably up to 4 carbon atoms in each alkyl group, and aryl phosphates, are especially preferred. Materials containing polar carbonyl or sulpho groups may also be desirable for raising Ts, in view of the results achieved by materials 13 and 19 to 24.

Mixtures of materials (i) and mixtures of materials (ii) may be used if desired.

Although the present invention does not necessitate cross-linking, cross-linking of the composition may still be effected if desired, and may produce further improvements in properties.

Within the specified range of properties for the gels and gelloids according to this invention, those having an ultimate elongation of at least 200% are preferred. Substantially elastic deformation (or substantially no hysteresis) up to an elongation of at least 200% is also preferred.

Mixtures comprising less than 300 parts, especially 200 parts or less, of the extender liquid, e.g. as in the hot melt adhesives described in U.S. Pat. Nos. 4,141,876 and 4,104,323, per 100 parts of block copolymer, generally do not behave as gel or gelloid compositions. Such mixtures tend to be too hard and to have too high an ultimate tensile strength and dynamic storage modulus, especially when tackifying resins are added.

Preferred gel or gelloid compositions according to the present invention either have a cone penetration value within the range from 200 to 400 ($10^{-1}$ millimetres) ("soft" gels), and comprise preferably at least 567, and preferably not more than 5000 parts by weight of the extender liquid per 100 parts by weight of the polymer; or have a cone penetration value within the range from 50 to 199 ($10^{-1}$ millimetres) ("hard" gels), and comprise preferably 300–566 parts by weight of the extender liquid per 100 parts of the polymer.

The extender liquid preferably has a boiling point higher than the softening or melting temperature of the gel copolymer, and the extender liquid is preferably mixed with the copolymer at a temperature not less than its melting or softening temperature. Mastication or other mixing techniques at lower temperatures, perhaps with the aid of volatile solvents, may however be used if the resulting composition is acceptable for the intended end use.

The extending liquids useful in the compositions of this invention comprising the block copolymer and plasticiser-stabilising additive as aforesaid may be selected from oils conventionally used to extend elastomeric materials. The oil may be a hydrocarbon oil such as paraffinic or naphthenic oils, synthetic oils such as polybutene or polypropene oils, and mixtures thereof. The preferred oils are substantially non-aromatic mixtures of paraffins and naphthenic hydrocarbon oils. The oils should have a minimum boiling point higher than the softening point of the block copolymer(s). Examples of suitable oils include those available from Fina Chemicals under the trade mark "Fina Vestan" in grade A360B (preferred), "Drakeol 34" from Penreco, and "Witco 380PO" from Witco.

The ratio of polymer to the oil will generally range from 2 to 30 parts polymer mixture to 70 to 98 parts oil. In general, for "soft" gels, it is preferred to use 3 to 15 parts of the block copolymer with 97 to 85 parts oil and most preferred for many applications to use from 4 to 12 parts of the block copolymer, with 96 to 88 parts oil. For "hard" gels, a ratio of 15 to 30 parts of the block copolymer, most preferably from 18 to 25 parts, with the balance oil, is preferred.

The compositions of this invention are preferably prepared by mixing the oil with a blend of the polymer(s) and the additive material(s) at a temperature not less than the glass transition temperature of the hard blocks in the said block copolymer. The glass transition temperature of the hard blocks may have been raised by blending with PPO as described in the aforementioned W08800603). In order to achieve adequate mixing and for the polymer(s) to melt fully and disperse in the oil, sufficiently high temperatures and sufficient mixing shear are preferably used. The mixing at the elevated temperature should be continued until the mixture is uniform and all of the polymers are evenly dispersed or blended in the oil. After sufficient mixing, the composition is then moulded into the desired shapes and allowed to cool. The resulting elastomeric composition can be re-melted and again cooled without any significant change in physical properties.

The oils useful in the radiation-cross-linked versions of the compositions of this invention can, for example, be the same oils as above. The cross-linking agents useful in the electron beam radiation cross-linking of the polymer-oil composition, the amount of cross-linking agent, and the electron beam radiation dosage will depend on the composition, its configuration and the degree of cross-linking desired, and may be selected by the usual criteria, for example along the lines disclosed in the aforementioned European Published Patent Application 0224389.

It will be useful to use various additives for various purposes in any of the compositions of this invention. Such additives may be stabilisers, antioxidants, flame retardants, tackifiers, corrosion inhibitors and the like. It is useful to use antioxidants in all the compositions of this invention.

The compositions of this invention can be made having a wide range of physical properties, such as cone penetration, ultimate elongation, and tear strength, desirable for particular end use applications. The compositions have numerous uses as elastomeric materials and in particular may be used as sealing materials, for example as illustrated in published European Published Patent Applications 0108518 and 0191609, although the compositions of this invention will have many and varied uses depending on the properties desired and the temperatures to be encountered.

Gel compositions within the scope of this invention are preferably defined by the following criteria (1) to (8), of which preferably not more than one criterion (not (1) or (2)) will be outside the specified ranges. These criteria are derived from Tests I to V described in the aforementioned W08800603, the disclosure of which is incorporated herein by reference.

I Cone Penetration (1) Cone penetration value in the range 50–400 (1/10 mm).

II Tensile Testing (2) Ultimate Elongation greater than 100%.

(3) Ultimate Tensile Strength Less than 1 MPa.

III Dynamic Viscoelastic Properties (23° C.)

(4) Dynamic Storage Modulus, G', less than 100,000 Pa at 1 Hz, preferably less than 50000 Pa, more preferably 5000 to 15000 Pa at 1 Hz.

(5) Dynamic Mechanical Damping, Tan Delta, less than 1.00 at frequencies less than 5 Hz.

IV Dynamic Viscoelastic Properties (80° C.)

(6) Dynamic Storage Modulus, G', greater than 10 Pa at 1 Hz.

(7) Dynamic Mechanical Damping, Tan Delta, less than 1.00 at frequencies less than 5 Hz.

V Stress Relaxation (8) Relaxation Time greater the 900 seconds.

The softening point (Ts) of the gel compositions increases as the proportion of temperature-raising additive increases. Preferably, the amount of additive is at least 3%, preferably at least 5%, and not more than 25% by weight of the whole gel composition, more preferably 10 to 15 weight per cent.

Softening point of the gel compositions is determined by standard Thermal Mechanical Analysis Techniques, such as the duPont TMA using a load of 5 grammes and a heating rate of 5° C. per minute. By way of illustration the general method of preparation of the gels using the listed additive materials according to this invention will now be described.

MATERIALS—150 g containing:

7.5% w/w Kraton G1651 copolymer
20.0% plasticiser
1.0% Irganox 1010 antioxidant
71.5% A360B paraffin oil extending.

The materials were stirred cold, under nitrogen, for at least 30 minutes in order to flush the flask of air and allow the copolymer to absorb some of the oil. Heat was applied steadily until considerable swelling occurred and the mixture became very viscous (depending on the plasticiser this could occur at any temperature in the range 80°–180° C.). Heat was then applied with caution and was maintained until a homogenous, molten gel containing no undissolved copolymer was observed or up to a maximum temperature of 220° C. Heating and stirring were stopped and after the gel had become cold and set, the flask was uncovered and the gel removed intact.

The gels of this invention may be especially useful when used as a sealing in an electrical connection terminal enclosure, cable splice, or cable termination, or in a kit or component for making such an enclosure, splice, or termination.

Examples of gel compositions specifically formulated for such purposes will now be described in percentages by weight.

| | Example A | Example B |
| --- | --- | --- |
| Kraton G1651 | 8.5 | 8.5 |
| Indopol H300 | 20 | 20 |
| (polybutene-isoprene tackifier) | | |
| Fina A360 oil | 54.88 | 54.88 |
| Genemol P | 5 | 5 |
| (phosphate) | | |
| Bisoflex TOT | 10 | 5 |
| (ester-type plasticiser) | | |
| Bisoflex 234 | — | 5 |
| (ester-type plasticiser) | | |
| Irganox 1010 | 0.12 | 0.12 |
| (anti-oxidant) | | |
| Irganox 1076 | 1.0 | 1.0 |
| anti-oxidant) | | |
| Tinuvin 327 | 0.5 | 0.5 |
| (UV Stabiliser) | | |

"Indopol H300" (TM) is available from Amoco Chemicals. "Bisoflex 234" (TM) is available from British Petroleum. "Irganox 1076" (TM), and "Tinuvin 327" (TM) are available from Ciba-Geigy. The other materials have been referred to earlier herein.

The Ts of these gels was 128° C. for example A and 124° C. for the example B, compared with Ts of 125° C. for the same gel replacing the Genemol and Bisoflex additives with a corresponding additional amount of the oil.

The gels preferably contain at least 75 parts by weight (more preferably at least 100 parts by weight, especially at least 150 parts by weight, and in some cases even 200 or more parts by weight) of the said additive per 100 parts by weight of the block copolymer material (a).

We claim:

1. A gel or gelloid liquid-extended polymer composition having (i) an ASTM D217 cone penetration value within the range from 50 to 400 ($10^{-1}$ millimetres), (ii) an ASTM D412 ultimate elongation greater than 100% with substantially elastic deformation to an elongation of at least 100% (iii) and ASTM D412 ultimate tensile strength of less than 1 MegaPascal, and (iv) a dynamic storage modulus at 23° C. of less than 100000 Pascals; the composition comprising an intimate mixture of (a) at least one block copolymer containing relatively hard blocks and relatively elastomeric blocks;

(b) at least 300 parts by weight of extender liquid per 100 parts by weight of the said copolymer(s), which liquid extends and softens the elastomeric blocks; and (c) at least 50 parts by weight per 100 parts by weight of the copolymer(s) (a), of a plasticiser-stabilising additive comprising (i) a stabilising material capable of either establishing substantial equilibrium with, or resisting migration into the composition of, one or more PVC plasticisers of a plasticised PVC article with which the composition in use is to be placed in surface contact;

and either the stabilising material (i) raises or does not significantly depress the softening temperature of the composition, in which case the additive (c) may optionally include (ii) a temperature-raising material which raises the softening temperature of the composition;

or the stabilising material (i) significantly depresses the softening temperature of the composition, in which case the additive (c) includes a sufficient quantity of the temperature-raising material (ii) to compensate for at least 50% of the depression caused by the stabilising material wherein either of material (i) or optional material (ii) of the said additive is selected from the group consisting of 2,2-oxybis(ethanol)dibenzoate and organic phosphates.

2. A composition according to claim 1, wherein the copolymer hard blocks comprise polystyrene.

3. A composition according to claim 1 or 2, wherein the copolymer elastomeric blocks comprise a polyalkylene material.

4. A composition according to claim 2, wherein the copolymer is a styrene-alkylene block copolymer.

5. A composition according to claim 1, wherein at least one material of the additive (c) and the extender liquid (b) is substantially incompatible with the copolymer hard blocks.

6. A composition according to claim 1, wherein at least one of the materials (i) and (ii) of the said additive has a solubility parameter (calculated from Small's group molar attraction constants) of at least 9.

7. A composition according to claim 6, wherein the said solubility parameter is within the range from 9.0 to 10.6.

8. A composition according to claim 6 or 7, wherein at least one of the materials (i) and optional material (ii) of the said additive is liquid at room temperature and miscible with the extender liquid (b).

9. A composition according to claim 1, wherein the stabilising material (i) of the said additive is a PVC plasticiser and the additive includes the said temperature-raising material (ii).

10. A composition according to claim 1 wherein either of material (i) or optional material (ii) of the said additive is an organic phosphate.

11. A composition according to claim 10, wherein the phosphate is an alkyl phosphate having up to 6, carbon atoms in each alkyl group.

12. A composition according to claim 10, wherein the phosphate is an aryl phosphate.

13. A composition according to claim 10, wherein the phosphate is a halogenated phosphate.

14. A composition according to claim 10, wherein the phosphate is triphenyl phosphate, tris(1-chloroethyl)-phosphate, 2,2-bis(chloromethyl)-1,3-propylene-(bis(2-chloroethyl)phosphate), or, tris(1,3-dichloropropyl)-phosphate.

15. A composition according to claim 10, wherein the phosphate is triethyl phosphate or tris(1-chloroprop-2-yl) phosphate.

16. A composition according to claim 1, comprising 5 to 25 weight percent of the additive, based on the weight of the whole composition.

17. A composition according to claim 1, whose softening temperature is higher than that of the corresponding gel composition without the said additive.

18. A composition according to claim 1, when used as a sealant in an electrical connection terminal enclosure, cable splice, or cable termination, or in a kit or component for making such an enclosure, splice or termination.

19. A composition according to claim 1, having an ASTM D217 cone penetration value within the range (a) from 200 to 400 ($10^{-1}$ millimetres), or (b) from 50 to 199 ($10^{-1}$ millimetres).

* * * * *

UNITED STATES PATENT AND TRADEMARK OFFICE
CERTIFICATE OF CORRECTION

PATENT NO. : 5,442,004
DATED : Aug. 15, 1995
INVENTOR(S) : Sutherland, et al

It is certified that error appears in the above-indentified patent and that said Letters Patent is hereby corrected as shown below:

Cover Page [57] ABSTRACT, line 2, replace "extending" by--extender--.

Column 1, line 58, replace "extending" by-extender--.

Column 5, line 58, replace "extending" by--extender--.

Column 7, line 57, replace "sealing" by---sealant--.

Signed and Sealed this

Seventh Day of November, 1995

*Attest:*

*Attesting Officer*

BRUCE LEHMAN

Commissioner of Patents and Trademarks